June 22, 1943.  L. S. KASSEL  2,322,366
HYDROCARBON CONVERSION PROCESS
Filed Nov. 29, 1939   3 Sheets-Sheet 1

INVENTOR
LOUIS S. KASSEL
BY ATTORNEY

Patented June 22, 1943

2,322,366

UNITED STATES PATENT OFFICE 2,322,366

HYDROCARBON CONVERSION PROCESS

Louis S. Kassel, Chicago, Ill., assignor to Universal Oil Products Company, Chicago, Ill., a corporation of Delaware Application November 29, 1939, Serial No. 306,639

2 Claims. (Cl. 196—49)

This application is a continuation-in-part of my co-pending application, Serial No. 274,178, filed May 17, 1938, now U. S. Patent 2,271,646.

This invention relates to an improved method for accomplishing successive contact catalytic reactions wherein different catalysts are employed in some regular sequence, the position of each of the contact masses being contingent upon the dependent relation of one reaction to the other, the conditions employed, and the optimum conditions for each reaction.

The invention is particularly applicable in processes involving a combination of reactions, either endothermic or exothermic or both or, in some cases, reactions where the heat of reaction is substantially zero, which reactions may be conducted at substantially the same conditions of temperature and pressure and where the different reactions are an essential feature in producing the desired result.

All of the reactions involved in any particular combination, hereafter referred to as a stage, are preferably conducted under adiabatic conditions with means provided for tempering or readjusting the temperature of the reactants between the various stages in processes involving more than one stage. The invention may employ, for example, a process involving both dehydrogenation and catalytic cracking, which reactions are both endothermic. In this case, since better results may be obtained in the cracking of olefins as compared to the cracking of paraffins, it would be desirable to subject the reactants first to dehydrogenation followed by catalytic cracking of the conversion products from the first step.

In reactions conducted under adiabatic conditions, the heat of conversion is ordinarily obtained from the materials undergoing conversion and the temperature, therefore, of these materials is lowered and is substantially directly proportional to the amount of material being converted. It is desirable, therefore, to employ relatively shallow beds of catalytic material and relatively short contact times in order that the temperature is not lowered more than a predetermined value. Therefore, after one particular combination of reactions has been completed in one stage of the process and the temperature lowered to some predetermined value, the conversion products leaving the last reaction zone are preferably conducted to a heating zone where they are again raised to the same temperature as the material entering the system or to a higher temperature, since the reaction products become more and more refractory as the treatment progresses. Between each stage of the process, therefore, a heating zone is preferably employed and the number of stages determines the number of heating zones.

Other treatments which may advantageously be accomplished, according to the objects of this invention, include the process which involves a combination of catalysts most suitable for conducting, first, dehydrogenation of aliphatic hydrocarbons followed by cyclization of the dehydrogenated products to produce aromatic hydrocarbons. The invention, however, is not limited to the particular combinations herein disclosed but may be employed in any combination of endothermic catalytic reactions or combination of either of the above named reactions with reactions wherein the heat of reaction is substantially zero. In combinations involving exothermic reactions, it is understood, of course, that in place of the heating zone between each stage a cooling zone will be employed in its place.

In processes employing catalysts to assist in the conversion reaction, such as, for example, in polymerization, which is a good example of an exothermic reaction, and catalytic cracking, which is an example of an endothermic reaction, the activity of the catalyst deteriorates, due to the deposition thereon of carbonaceous materials. However, in the case of the latter, the deposition is quite rapid, where in the case of the former the deposition is much slower. In order to obtain best results, the catalysts are alternately subjected to processing and reactivation, and in the case of polymerization, hydrogenation, and other reactions both the processing and reactivation would be exothermic, where in the case of catalytic cracking, dehydrogenation, and other related treatments the processing would be endothermic and reactivation exothermic. Reactivation of the catalyst may be accomplished by passing a stream of heated relatively inert gases containing controlled amounts of air through the catalyst bed. The burning of the carbonaceous material being exothermic, some form of temperature control is required for preventing excessive heating of the catalyst particles and consequent destruction of their catalytic activity.

Catalytic cracking, dehydrogenation, and cyclization are good examples of the type of conversion reaction to which the invention is particularly well adapted, because in these reactions, due to the rapid deposition of carbonaceous materials, the processing and reactivation is ordinarily carried out on a cyclic basis, the catalyst being periodically alternated from processing to reactivation and vice versa.

When endothermic or exothermic reactions, such as those above mentioned, are conducted by contacting the reactants with a mass of catalytic material in the manner heretofore commonly employed, the design of the apparatus, particularly with respect to the size of the zone or zones containing the catalytic material, is limited to heat transfer requirements in order to adequately control the reaction temperature. For example, it is customary to dispose the catalytic material in a plurality of tubular elements connected for parallel flow of the reactants therethrough and to bathe the tubes in a fluid heating or cooling medium depending upon whether the reaction is endothermic or exothermic. In such cases, the diameter of each tube is limited to that which will give a good rate of heat transfer from the catalyst bed disposed therein and reactants passing therethrough to the cooling medium surrounding the tubes, or from the heating medium surrounding the tubes to the reactants and catalyst.

Increased capacity cannot be obtained with the same degree of control, except by increasing the number of parallel tubes employed, without increasing their size. Reactors embodying this type of design become extremely cumbersome and expensive with the high charging stock capacities which are ordinarily desired for commercial operation, with the result that the economies one would expect from large scale operations are not attained. The commercial operation becomes more complicated when attempting to accomplish the combination of reactions with which this invention is most largely concerned in reactors of the type referred to above.

The invention involved in my previous application, Serial No. 274,178, now U. S. Patent 2,271,646, overcomes the limitations above mentioned to make it possible to conduct large scale catalytic operations, above mentioned, in an efficient and economic manner. In this invention a plurality of catalyst beds are employed connected for the series flow of the reactants therethrough with provisions for heating or cooling the reactants as required (depending upon the endothermic or exothermic nature of the reaction) either as they pass from each catalyst bed to the next succeeding catalyst bed, or and preferably as they pass from one stage to the next succeeding stage. The design of the apparatus and conditions of operation are such that the temperature of the reactants does not rise or fall beyond allowable limits in passing through any stage of the series and such that the temperature of the reactants is readjusted to the desired value as they pass from one stage to the other.

The improved method herein provided for conducting combinations of endothermic reactions or exothermic reactions is not limited to any specific form or type of apparatus, but a great number of specific forms of apparatus may be devised to incorporate the features of the invention. Neither is the invention limited to any specific combination of endothermic reactions or exothermic reactions of a catalytic type, since, as evidenced by the examples above given, its advantageous features are applicable to a wide variety of specific operations. However, to avoid confusion, the following description will be directed primarily to illustrating the features of the invention as applied to a combination involving dehydrogenation and catalytic cracking of hydrocarbon oils and further to periodic reactivation of the catalytic material employed.

In the accompanying drawings

Figure 1 illustrates a simple form of apparatus embodying the broad features of the invention and in which the improved process provided by the invention may be conducted.

Figure 2 is essentially a flow diagram of a process for the treatment of hydrocarbons wherein said hydrocarbons are first subjected to dehydrogenation treatment followed by catalytic cracking treatment in a plurality of catalytic reaction zones connected in series, in each of which zones processing and reactivation of the catalytic material are alternately accomplished with provision for controlling the temperature of the stream of reactants flowing from each pair of catalyst zones to the next pair of catalyst zones of the series in which dehydrogenation is accomplished in the first zone followed by cracking in the second zone.

Figure 1:
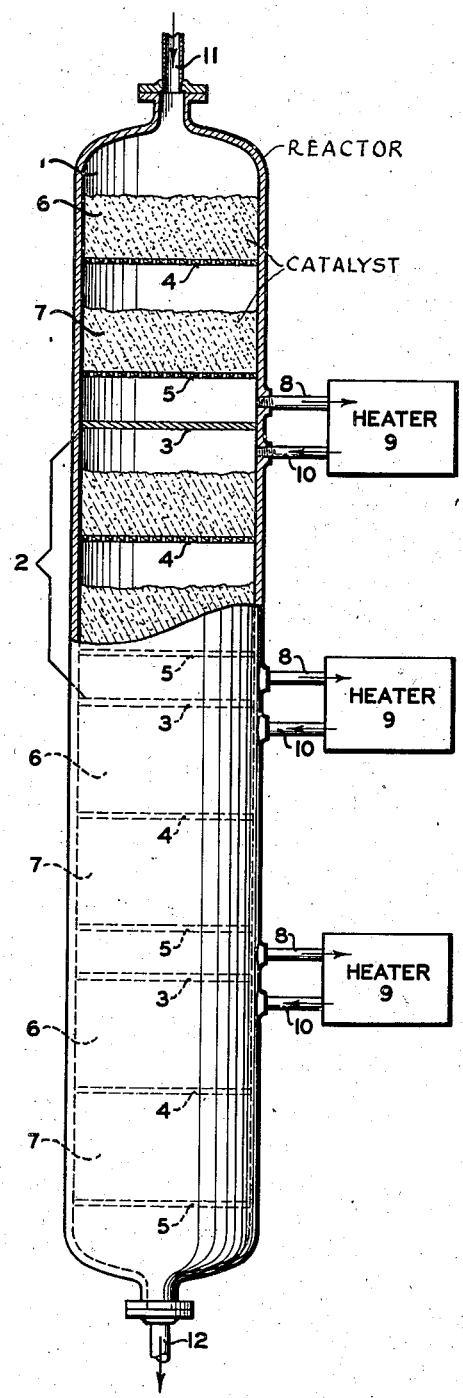

Referring to Figure 1, reactor 1 is an elongated cylindrical column divided into a plurality of compartments 2 by means of solid partition plates 3 extending horizontally across the column. Each of the compartments 2 is provided with two perforated plates 4 and 5 which serve as supporting members for the beds of catalytic material 6 and 7, respectively, disposed in each of the compartments. In the case here illustrated, bed 6 is composed of catalytic material capable of promoting the dehydrogenation reaction, while bed 7 is composed of catalytic material capable of promoting the cracking reaction.

A space is left on opposite sides of each of the partition plates 3, the upper space between perforated plate 5, and plate 3 communicating through conduit 8 with an inlet of a suitable heater or heat exchanger 9 which discharges through line 10 into the space between plate 3 and the next succeeding catalyst bed 6 which, in the case here illustrated, is composed of a dehydrogenating catalyst.

The hydrocarbons to be treated enter the upper end of reactor 1 through line 11, preferably in essentially the vaporous state, and preheated by well known means, not illustrated, to a temperature at which the desired reaction will occur upon contact with the catalytic material. These heated vapors pass downward through the first or dehydrogenation catalyst bed 6 in direct and intimate contact with the catalyst particles, and the dehydrogenation reaction accomplished in this bed reduces the temperature of the vapors undergoing treatment to some predetermined value. The vapors leaving catalyst bed 6 at a lower temperature than the entering vapors, the heat content of which is sufficient for catalytic cracking to be effected, are then contacted with the second or catalytic cracking catalyst bed 7, and the reaction accomplished therein reduces the temperature of the vapors to some predetermined value which, under ordinary circumstances, will be some temperature below that at which any further reaction may be accomplished with any great degree of conversion.

The successive treatments which involve first dehydrogenation followed by catalytic cracking, as described above, are useful from the standpoint that dehydrogenation prepares an ideal charging stock for catalytic cracking, because from experiment it has been determined that olefins may be cracked more readily than paraffins. In addition, a sequence of reactions permits each reaction to be carried out under the most suitable temperature conditions. After leaving the bed of cracking catalysts, the temperature of the reactants or vapors is below that most suitable for further treatment. Before contacting the next succeeding bed of catalytic material, the vapors are passed through the first heater 9 and are therein reheated to either substantially the same temperature as that prevailing above the first catalyst bed, but preferably to a higher temperature, since the reactants become more refractory as the reaction proceeds. The reheated vapors are supplied to the second compartment 2 wherein they pass first through a bed of dehydrogenation catalysts 6 and then to the next succeeding bed of cracking catalysts 7. Since there is a small temperature drop in each compartment, the vapors leaving each compartment, except the last, pass through one of the heaters 9 prior to their contact with the next succeeding beds, and the final conversion products are directed from the lower portion of the reactor through conduit 12 to suitable separating and recovery equipment, not illustrated.

It is, of course, within the scope of the invention to employ any required number of beds of catalytic material through which the reactants are passed in series, the size of each bed, and more specifically the beds in each compartment, being sufficiently small in proportion to the volume of vapors passing therethrough in a given time, that the temperature drop is not excessive. The temperature of the reactants is maintained within the range of that required for best results.

The various beds of catalytic material may be disposed within a single reactor or two or more reactors, each containing one or more beds of catalytic material, the reactors being connected in series and provision being made for reheating the reactants as they pass from each catalyst bed, but preferably from each group of catalyst beds to the next succeeding group.

Figure 2:
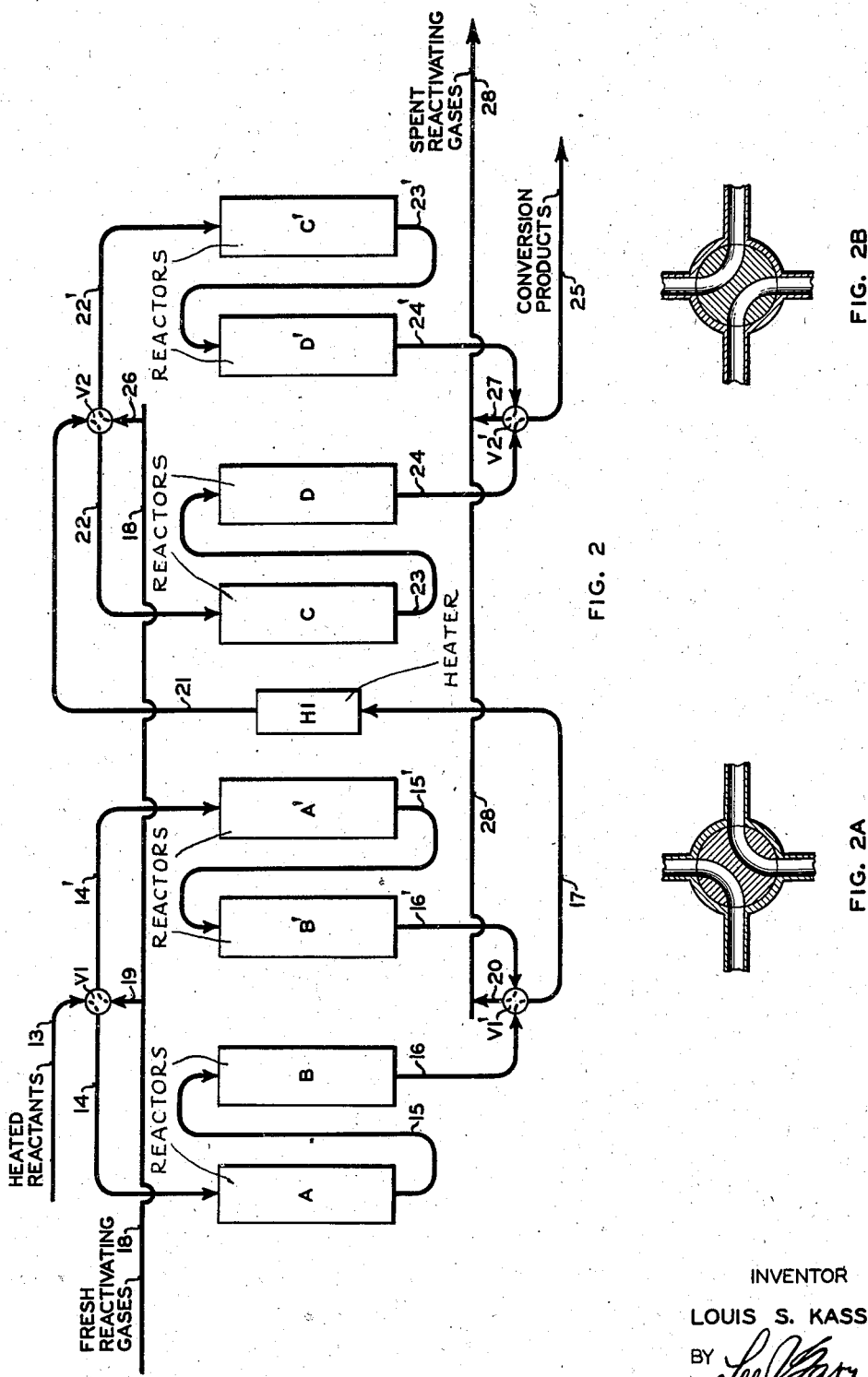
Figures 2A and 2B are enlarged sectional detail views of the four-way switching valves V1' and V2' respectively, shown in Figures 2 and 3.

Referring now to Figure 2, previously mentioned, it is essentially a flow diagram of a process employing the features of the invention. In the particular case here illustrated, two groups or a total of eight catalytic reactors, there being four to each group, are employed, the first pair in the first group being designated as A and A', the second pair in the first group as B and B', the first pair in the second group as C and C', and the second pair in the second group as D and D'. Each reactor contains a bed of catalytic material, not indicated in the drawing, capable of promoting the desired reaction when in a fresh or freshly reactivated state. In the case here illustrated, for example, reactors A, A', C, and C' contain dehydrogenation catalysts, and reactors B, B', D, and D' cracking catalysts. The size of each catalyst bed is so proportioned in relation to the volume of vapors to be cracked in a given time that the drop in temperature sustained by the vapors in their passage through the bed is not excessive. (i. e., the temperature range of the vapors entering the bed and leaving the bed is within the limits of the temperature range at which active dehydrogenation or catalytic cracking of the vapors will occur).

Two reactors of each group are employed as a conversion zone (i. e., one dehydrogenation zone and one cracking zone), while the catalyst in the corresponding reactors of each group is being reactivated by passing therethrough a stream of hot relatively inert gases, (such as combustion gases, for example), containing controlled amounts of air or oxygen. Each pair of reactors in each group is alternately operated with respect to the service for which they are employed (processing and reactivation), by means of inlet switching valves V1 and V2 and the outlet switching valves V1' and V2'.

Any suitable valve arrangement capable of switching the direction of flow of the stream of reactants and the stream of reactivating gases may be employed within the scope of the invention and, for the sake of simplifying the description and illustrating the process without unnecessary complications, each of the switching valves is here illustrated as a single four-way valve in which the position of the two passageways therethrough may be shifted as illustrated in Figures 2A and 2B. Assuming that inlet valves V1 and V2 are each adjusted to the position illustrated in Figure 2A, and outlet switching valves V1' and V2' are each adjusted to the position illustrated in Figure 2B, the stream of hydrocarbon vapors heated and vaporized in a suitable heating zone, not illustrated, and is supplied to the system through line 13, flows through valve V1 into line 14 and thence to reactor A. After being subjected to contact with a dehydrogenation catalyst in reactor A, the vapors are directed through line 15 into reactor B and contacted therein with a cracking catalyst. The vapors leaving reactor B are directed through line 16 and valve V1' wherethrough they pass to line 17 and thence to heater H1, which may be any suitable form of heater or heat exchange device capable of reheating the vapors to substantially the same or to a higher temperature than that prevailing in line 13. The reheated vapors are directed from heater H1 through line 21 to valve V2 wherethrough they pass into line 22 and thence to reactor C. After passing through the bed of catalytic material in reactor C, the partially cooled vapors are directed through line 23 into reactor D and the cooler vapors from reactor D directed through line 24 to valve V2' wherethrough they pass into line 25 by means of which they are conveyed to suitable separating and fractionating equipment or to any desired further treatment. Thus the vapors to be converted, instead of passing through two relatively large catalyst beds in which the temperature drops would be excessive in the absence of means, such as previously mentioned, for preventing the same, they are passed in series through smaller catalyst beds wherein the temperature drop is not excessive. The vapors are reheated to the desired degree as they pass from each group of reactors to the next successive group, the reaction temperature being thereby maintained within the optimum limits during the entire catalytic reaction.

Although I have illustrated a process employing only two groups of catalytic reactors, it is, of course, within the scope of the invention to employ more than two groups in order to obtain the desired results.

With the flow of hydrocarbon vapors through reactors A, B, C, and D, in the manner above described, reactivating gases supplied to the system in a heated state through line 18 are directed through branch lines 19 and 26 to the respective valves V1 and V2 wherethrough they pass in to respective lines 14' and 22' and thence to the respective reactors A' and C' wherein they contact the beds of catalytic material disposed in these zones which have become fouled or partially spent by previous use. The deleterious deposits of carbonaceous material are thereby burned from the catalyst beds, the rate of burning being regulated by the oxygen content of the reactivating gases which is controlled to prevent the development of excessive temperature in the catalyst bed.

The reactivating gases from reactors A' and C' are directed through the respective lines 15' and 23' to respective reactors B' and D' in order to remove by combustion the carbonaceous deposits on the catalyst of the latter two reactors. The resulting spent reactivating gases and combustion products are directed from the respective reactors B' and D' through respective lines 16' and 24' to the respective outlet switching valves V1' and V2' wherethrough they pass to the respective lines 20 and 27 into line 28.

The temperature of these gases will be increased by the exothermic reaction (burning of the carbonaceous material) in the reactor, and preferably useful heat recovered therefrom for any required purpose and in any desired manner, not illustrated, following which the resulting cooled gases may be wasted or, when desired, they may be recirculated by means of a suitable pump or compressor, not shown, to line 18 and therein commingled with controlled amounts of air for supporting combustion, the latter being supplied in any desired manner. In this manner, the inert components of the reactivating gases may be continuously recycled through the system, but it is also within the scope of the invention, when desired, to continuously generate fresh combustion gases, for example, or steam for this purpose, by well known means not illustrated.

In the following operation, above described, when the catalyst in reactors A, B, C, and D approaches the state of reduced activity, at which time it is advantageous to employ freshly regenerated catalyst for treatment of the vapors, the supply of air to the reactivating gas stream is momentarily discontinued so that the reactors A', B', C', and D' are purged of oxygen-containing gases while the inlet and outlet switching valves remain in an unchanged position. Immediately following this purge of reactors, A', B', C', and D', the position of the inlet switching valves V1 and V2 is shifted to that indicated in Figure 2B, while the supply of air to line 18 is still discontinued so that reactors A, B, C, and D are purged of hydrocarbon vapors and the stream of vapors from line 13 is diverted to reactors A', B', C', and D'. After a time sufficient to allow purging of each of the reactors, the positions of outlet valves V1' and V2' are shifted to that indicated in Figure 2A and air is again admitted to line 18 whereupon the catalytic material in reactors A, B, C, and D is reactivated and the catalytic material in reactors A', B', C', and D' is utilized to promote conversion of the vapors supplied thereto.

Switching of the stream of hydrocarbon vapors and reactivating gases is periodically repeated by reversing the position of the switching valves so that the partially spent catalytic material in one pair of reactors of each group is continuously being reactivated and the stream of hydrocarbon vapors is continuously converted in the other pairs of reactors of each group. Preceding the change of function in each pair of reactors, the reactors are purged with relatively inert gases and, preferably, as indicated in the foregoing description, there is a sufficient delay between the switching of the inlet valves and the switching of the outlet valves to prevent the loss of valuable conversion products from the reactors being purged thereof and to prevent the commingling of inert gases from the reactors which have been purged with the stream of conversion products. Also, the operation of the valves on the various pairs of reactors of each group are correlated to prevent the commingling of reactants or conversion products with reactivating or purging gases, (i. e., valves V1 and V2 are first switched, and after a delay corresponding to the time required to purge reactors A, B, C, and D or reactors A', B', C', and D', valves V1' and V2' are simultaneously shifted).

When desired, instead of changing the function of each pair of reactors in the several stages simultaneously, a change of function may be effected only between the two pairs of reactors in each stage at any one switching operation, in which case the position of only two switching valves would be changed at each switching period. For example, when it is desired to effect a change of function between reactors A and B and A' and B', valve V1 is first switched, and after a delay corresponding to the time required to purge reactors A, B, A', and B', the position of valve V1' is shifted, while valves V2 and V2' remain substantially in the same position. Likewise, at the next switching period the positions of valves V2 and V2' would be shifted, while the positions of valves V1 and V1' would remain unchanged.

The switching valves may be manually operated, but preferably to simplify operation of the process and to avoid mistakes in operation of the valves which might prove disastrous, both the inlet and outlet switching valves are operated from a single time cycle controller of any well known form in accordance with a definite predetermined schedule. However, except with respect to the sequence of operation of the various valves, this is not a novel part of the present invention. For the sake of avoiding unnecessary complications, automatic control means are not illustrated. Several forms of time cycle controllers capable of accomplishing the desired results are now available.

Figure 3:
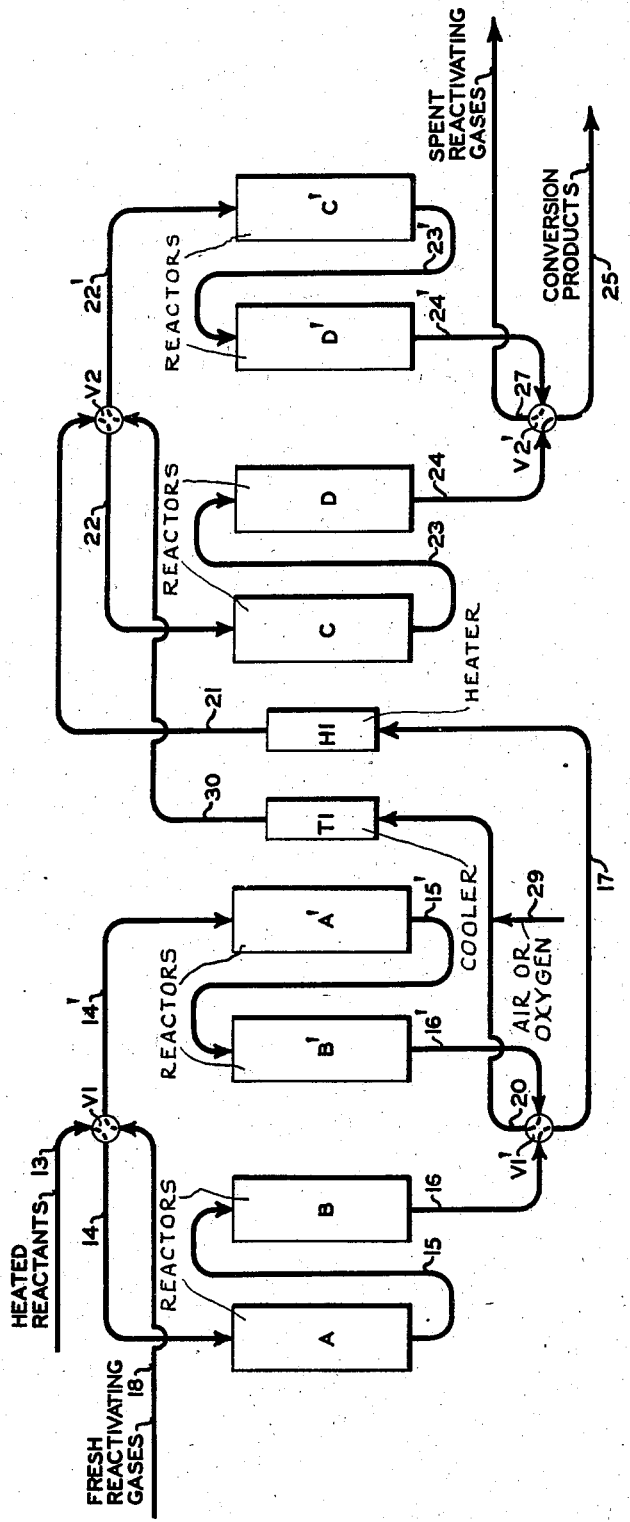
Figure 3 is a flow diagram illustrating the modification of a portion of the flow illustrated in Figure 2.

Referring now to Figure 3, which illustrates a modification of the flow illustrated in Figure 2, the various reactors, switching valves, heaters, and communicating lines, designated by the same reference numerals in Figure 3 as in Figure 2, represent identical equivalent equipment which functions in the manner described with reference to Figure 2.

The essential difference between the flow shown in Figures 2 and 3 is that in the latter the reactivating gases pass in series through the reactors in which the catalytic material is being reactivated, and provision is made for cooling these gases as they pass from the first pair of reactors wherein reactivation is taking place to the next succeeding pair of reactors.

In Figure 3 the reactivating gases are supplied in the heated state through line 18 to valve V1 with the switching valves V1 and V2 in positions shown in Figure 2A and valves V1' and V2' in the positions shown in Figure 2B. The reactivating gases pass through valve V1 to line 14', thence through reactors A' and B', and the resulting spent reactivating gases and combustion products from reactor B' are directed through line 16' to valve V1' wherethrough they pass to line 20 and thence to cooler T1 which may comprise any suitable type of heat transfer equipment capable of reducing the temperature of the gases to substantially the same as that to which they are supplied to reactor A'.

Regulated quantities of air are added to the stream of relatively inert gases passing through line 20, the air being admitted thereto through line 29 so that the oxygen content of the reactivating gases as well as their temperature is readjusted to substantially the same value as that of the stream of reactivating gases supplied to reactor A.

The partially cooled oxygen-containing gases from cooler T1 pass through line 30 to valve V2 wherethrough they are directed to line 22' and thence through reactors C' and D'. The resulting spent reactivating gases and combustion products from reactor D' are directed through line 24' to valve V2' wherefrom they pass through line 27 to suitable heat recovery equipment, not illustrated, or elsewhere as desired.

When the position of the switching valves is reversed so that valves V1 and V2 are in the position illustrated in Figure 2B, valves V1' and V2' are in the position illustrated in Figure 2A, the oxygen-containing reactivating gases enter reactors A and C from the respective valves V1 and V2 through the respective lines 14 and 22 and the spent reactivating gases and combustion products pass from reactors B and D to the respective valves V1' and V2' to the respective lines 16 and 24, the path of the flow of the gases being otherwise the same as previously described.

The foregoing description relates particularly to a process involving a combination of only two individual reactions and types of contact materials. It is to be understood that the invention may be employed in a system involving more than two reactions where each of the reactions are to some extent dependent on the others. In all cases, the dependency of the individual reactions on each other is used in determining the particular sequence which the reactions follow to accomplish the desired results.

The invention when applied to a process involving dehydrogenation and catalytic cracking gave results as follows:

Combined feed consisting essentially of 60% of charging oil, a 36° A. P. I. gravity Mid-Continent gas-oil, and 40% of recycle oil was heated to a temperature of 930° F. The resulting vapors were subjected to contact with an alumina-chromia catalyst under substantially adiabatic conditions and as a result thereof the temperature was lowered to 890° F. The vapors at a temperature of 890° F. were subjected to contact with an alumina-chromia-zirconia cracking catalyst, likewise under adiabatic conditions, and as a result thereof the temperature was lowered to 880° F. The conversion products from the last mentioned cracking treatment were heated to 960° F. and the resulting vapors were subjected to the successive treatments of dehydrogenation and catalytic cracking. As a result thereof, the temperature was lowered to 910° F. The conversion products from the second stage were reheated to 990° F. and the resulting vapors again subjected to the successive treatments of dehydrogenation and catalytic cracking, whereupon the conversion products were subjected to fractionation for the separation of gasoline boiling range hydrocarbons from intermediate conversion products and residue, the latter recovered and the intermediate conversion products subjected to further treatment. The gasoline boiling range hydrocarbons, corresponding to approximately 40% conversion per pass and approximately 66.6% by volume of the charging oil, were recovered as products of the process.

I claim as my invention:

1. A hydrocarbon oil conversion process which comprises passing the oil through a first conversion sequence and therein subjecting the same to catalytic dehydrogenation and then to catalytic cracking, then heating the hydrocarbons to dehydrogenating temperature and introducing the same to a second conversion sequence, and subjecting the hydrocarbons in the second sequence to catalytic dehydrogenation and to catalytic cracking in the order named.

2. A catalytic conversion process which comprises passing a stream of hydrocarbons through at least two like reaction sequences, each containing a plurality of serially arranged catalyst bodies, in each of said sequences effecting catalytic dehydrogenation and catalytic cracking in the order named in the presence of said catalyst bodies, and, as the hydrocarbon stream passes from one sequence to the next succeeding sequence, readjusting its temperature to the hydrocarbon conversion temperature of said succeeding sequence.

LOUIS S. KASSEL.